(12) United States Patent
Ducellier

(10) Patent No.: US 6,411,409 B1
(45) Date of Patent: Jun. 25, 2002

(54) COMPACT DIFFRACTION GRATING BASED WDM DEMUX

(75) Inventor: Thomas Ducellier, Ottawa (CA)

(73) Assignee: JDS Uniphase Inc., Nepean (CA)

( * ) Notice: Subject to any disclaimer, the term of this patent is extended or adjusted under 35 U.S.C. 154(b) by 48 days.

(21) Appl. No.: 09/708,647

(22) Filed: Nov. 9, 2000

Related U.S. Application Data

(60) Provisional application No. 60/171,456, filed on Dec. 22, 1999.

(51) Int. Cl.[7] .................................................. H04J 14/00
(52) U.S. Cl. ........................ 359/124; 359/115; 359/130; 385/11; 385/24; 385/37
(58) Field of Search ............................... 385/11, 24, 37; 359/115, 124, 130

(56) References Cited

U.S. PATENT DOCUMENTS

| 4,741,588 | A | | 5/1988 | Nicia et al. ............... 350/96.16 |
| 5,299,056 | A | * | 3/1994 | Kurata et al. ............. 359/341.1 |
| 5,706,371 | A | * | 1/1998 | Pan ............................. 385/11 |
| 5,886,785 | A | | 3/1999 | Lefevre et al. ............. 356/328 |

* cited by examiner

Primary Examiner—Robert H. Kim
Assistant Examiner—George Wang
(74) Attorney, Agent, or Firm—Neil Teitelbaum

(57) ABSTRACT

In the area of wavelength division multiplexing (WDM), the present invention relates to a demultiplexer/multiplexer based on a diffraction grating, in which a beam of light is separated into two orthogonally polarized sub-beams prior to beam collimation. Due to the characteristics of the beam splitting crystal, parts of the sub-beams overlap resulting in portions of the sub-beams becoming improperly polarized. Too alleviate the errors cause thereby, an iris is placed over the diffraction grating to eliminate the portions of the light that have been polarized improperly.

10 Claims, 2 Drawing Sheets

COMPACT DIFFRACTION GRATING BASED WDM DEMUX

This application claims benefit of provisional application Ser. No. 60/171,456 filed Dec. 22, 1999.

The present invention relates to multiplexing and demultiplexing optical signals. and in particular to a diffraction grating based wavelength multiplexer/demultiplexer.

BACKGROUND OF THE INVENTION

Fiber optic telecommunications rely nowadays on a technique called "DWDM" (dense wavelength division multiplexing) to achieve higher bandwidth at lower cost. This technique utilizes many different wavelength bands each carrying an independent channel of information. These wavelengths usually span a 50 nm band in the 1.55 μm region. The ITU has normalized these wavelengths to lie on a periodic frequency grid with a spacing of typically 100 to 200 GHz. The present invention relates to a wavelength demultiplexer. This is a special kind of optical filter having one input receiving the wavelength multiplexed channels and several outputs each receiving the separated wavelength channels. U.S. Pat. Nos. 4,111,524; 4,198,117; 4,522,462 and 4,763,969 disclose typical WDM devices. It should be noted that everything that is stated in this disclosure relates both to demultiplexers (1 input and N outputs) and multiplexers (N inputs and 1 output), which are the same devices with the inputs and the outputs reversed.

A typical realization of a diffraction grating based dense WDM wavelength demultiplexer is illustrated in FIG. 1. The typical diffraction grating demultiplexer includes: coupling optics 1, which can be as simple as the optical fibers themselves, or include an array of micro lenses (as in European Patent EP 0859249A1); collimating optics 2, which can be one or more lenses, or a curved mirror (on which the grating can be directly written if needed); and a diffraction grating 3.

The most compact configuration is called the Littrow configuration, where the reflected output beams from the grating are almost aligned with the input beam (like in FIG. 1).

In order to achieve sufficient wavelength separation in the focal plane, the device must have a high dispersion. This is either done using a large focal length lens or using a high groove frequency grating. However, diffraction gratings suffer from polarization sensitivity when the groove frequency is above ca. 600 lines/mm. This implies that the focal length of the lens should be at least 20 mm for 200 GHz spacing.

Another approach is to use higher groove frequency grating in conjunction with some polarization processing to maintain low polarization sensitivity. This is described for example in U.S. Pat. No. 4,741,588, issued May 3, 1988 to Antonius Nicia et al. and U.S. Pat. No. 5,886,785, issued Mar. 23, 1999 to Herve Lefevre et al. The polarization processing used in these patents is done when the beams are collimated (see FIG. 2).

The main purpose of the polarization diversity technique is to convert input light into two sub-beams with the same polarization state, the one that has the highest diffraction efficiency from the grating (usually at 1.55 μm, it is a linear polarization perpendicular to the grating's grooves). This is achieved through the combination of a polarization splitting device 4, usually splitting input light into two perpendicular linear states of polarization 6 and 7 parallel and perpendicular to the grating lines, and a waveplate 8. The polarization splitting device 4 is either a polarization beam splitter or a birefringent beam displacer. The waveplate 8 is usually a single half-wave plate oriented at 45° with respect to the groove axis positioned in the path of one of the two sub-beams.

The main drawback of this technique is that since it is done with the collimated beams, which have relatively large diameters, this polarization-processing scheme is bulky.

SUMMARY OF THE INVENTION

An object of the present invention is to overcome the shortcomings of the prior art by providing a diffraction grating based WDM in which the polarization processing is executed prior to collimation.

Accordingly, the present invention relates to a wavelength division demultiplexer device comprising:

an input waveguide for launching an input multiplexed light beam into the device;

polarization beam splitting means for separating the input light beam into two polarized sub-beams;

first polarization rotating means for rotating one of the two sub-beams to provide two parallel polarized sub-beam, wherein a portion of one of the sub-beams is not properly polarized;

light collimating means for collimating the two parallel sub-beams;

diffraction grating means for separating the two sub-beam into a first and a second plurality of output light sub-beams; and light blocking means in front of the diffraction grating for eliminating at least some of the portion of one of the sub-beams not properly polarized.

BRIEF DESCRIPTION OF THE DRAWINGS

The invention will be described in greater detail with reference to the accompanying drawings which represent a preferred embodiment of the invention and wherein.

DETAILED DESCRIPTION OF THE INVENTION

Figure 1:
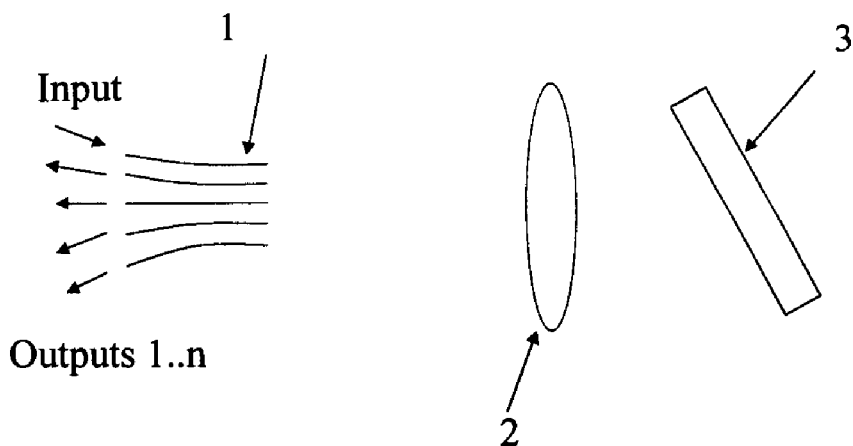
FIG. 1 is a schematic drawing illustrating a typical diffraction grating based WDM device.
Figure 2:
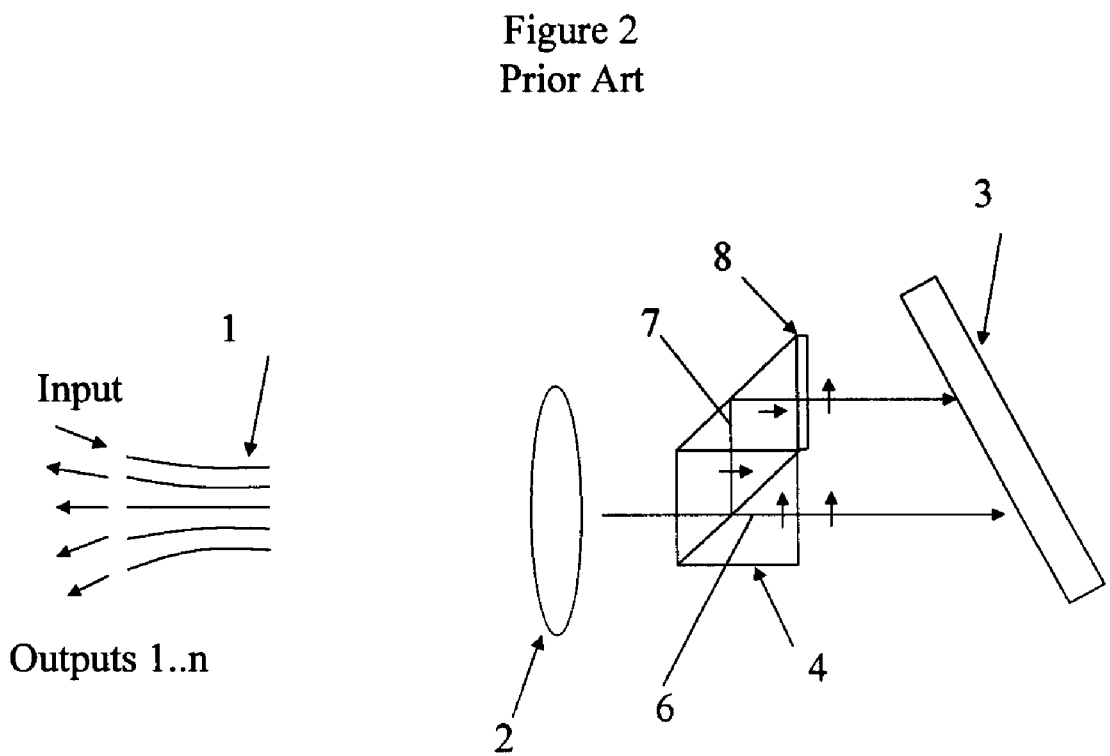
FIG. 2 is a schematic drawing illustrating a typical diffraction grating based WDM device with polarization diversity.
Figure 3:
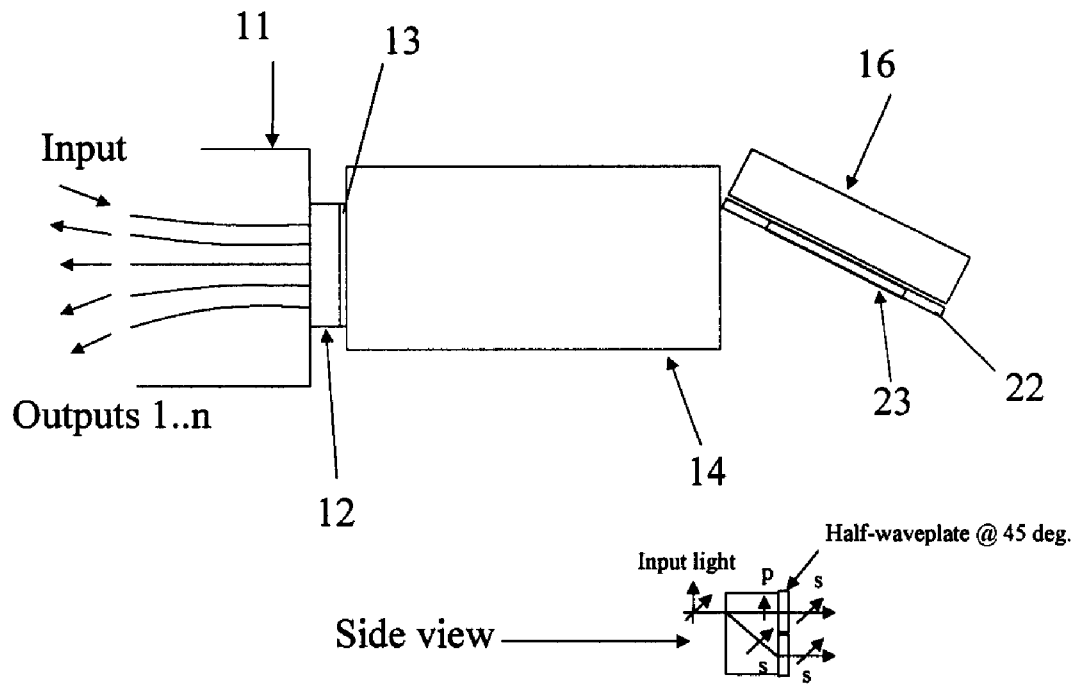
FIG. 3 is a schematic drawing illustrating the diffraction grating based WDM device according to the present invention.
Figure 4:
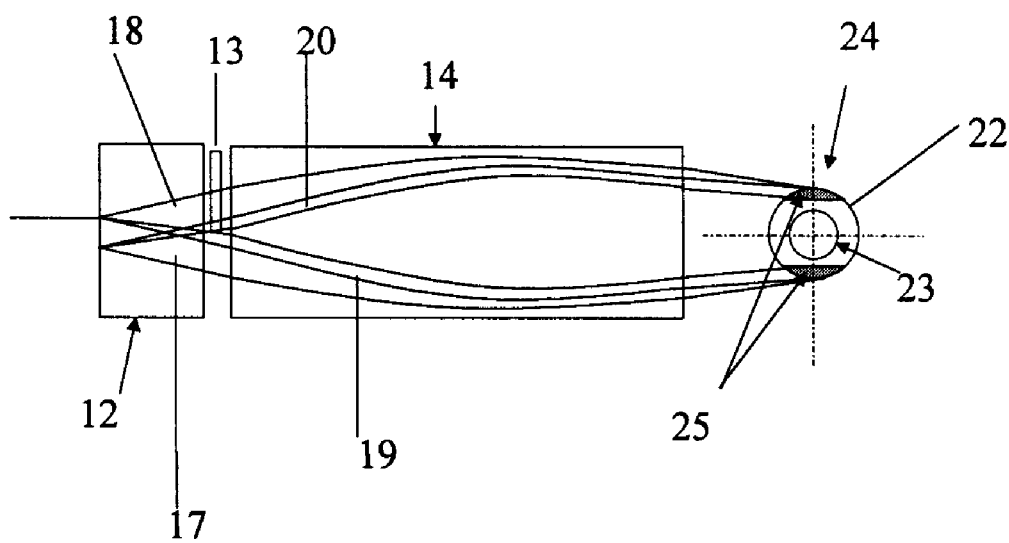
FIG. 4 is a schematic drawing illustrating the WDM device of FIG. 3.

With reference to FIGS. 3 and 4, the WDM of the present invention. is a very compact diffraction grating based wavelength demultiplexer for 200 GHz channel spacing including an input waveguide chip 11 supporting one input and N outputs, a polarization beam splitting element 12, a polarization rotator 13, a GRIN lens 14 as the collimating lens, and a high frequency groove grating 16. The polarization processing technique is in the focal plane to lower the polarization sensitivity of the device (see FIG. 3). More specifically, the diffraction grating 16 has 1200 l/mm, the GRIN lens 14 is an almost quarter pitch SLW3.0 from NSG, and the waveguide coupling scheme 11 (with about 21 microns between waveguides) are used to achieve 200 GHz channel spacing. The polarization processing technique is done in front of the collimating lens 14 and uses a rutile element 12 of 1 mm thickness. The rutile 12 is oriented in such a way as to separate the input light into two sub-beams 17 and 18 with s and p linear polarizations, respectively. A half-wave plate 13 covers the p-polarized sub-beam to convert it into s polarization (see FIG. 4). This way, all the input light is converted into s polarization, which has the highest diffraction efficiency.

However, with normal fiber, the polarization walk-off induced by rutile is too small. Therefore, the diverging beams emerging from the rutile 12 overlap. This will cause some of the input light not to be converted into s polarization (the part 19 of the p sub-beam 18 that will not traverse the waveplate). Furthermore this arrangement results in some of the input light to be improperly converted to p polarization (the part 20 of the s sub-beam 17 that will see the waveplate). This will result in unwanted polarization dependent loss.

To alleviate this polarization-overlapping problem, a light blocking plate, preferably in the form of an iris 22, is positioned on top of the grating 16 forming an aperture 23. In a preferred embodiment a special optical arrangement is used in which the two sub-beams 17 and 18 emerging from the rutile 12 are imaged superimposed on the orating 16 forming superimposed beam 24. This is easily achieved if the optical length from the waveguide 11 to the input facet oft he Grin lens 14 is the same as the optical length from the output facet of the Grin lens 14 to the grating 16. The polarization overlapping parts 19 and 20 of the sub-beams are imaged on the grating 16 as the top and bottom portions 25 of the superimposed beam 24 (see FIG. 4). Therefore, when the iris 22 is put on top of the grating 16, it can effectively eliminate the top and bottom parts 25 of the beam, and the polarization overlap will be removed. The effect of the iris 22 can also be described as a limitation of the input numerical aperture (NA), at the expense of increased loss.

The advantages of using an iris 22 on top of the grating 16 include:

reduces the input NA of the sub-beams 17 and 18 to increase polarization splitting from the rutile 12 at the expense of additional losses;

reduces the input NA of sub-beams 17 and 18 therefore lowering the spherical aberrations in the Grin lens 14;

creates an appropriate Fourier filter to enhance the channel bandwidth and lower the optical crosstalk (this is achieved when a diffracted Airy disk from the iris 22 is chosen such that the first dark ring falls on the neighboring channel).

I claim:

1. A wavelength division demultiplexer device comprising:

an input waveguide for launching an input multiplexed light beam into the device:

polarization beam splitting means for separating the input light beam into two polarized sub-beams;

first polarization rotating means for rotating one of the two sub-beams to provide two parallel polarized sub-beams, wherein a portion of one of the sub-beams is not properly polarized;

light collimating means for collimating the two parallel sub-beams;

diffraction grating means for separating the two sub-beam into a first and a second plurality of output light sub-beams; and light blocking means in front of the diffraction grating for eliminating at least some of the portion of one of the sub-beams not properly polarized.

2. The device according to claim 1, further comprising:

light focussing means for focussing the first and second plurality of output light sub-beams;

second polarization rotating means for rotating one of the plurality of sub-beams to provide two orthogonal pluralities of sub-beams;

polarization beam combining means for combining the two orthogonal pluralities of sub-beams into a plurality of output light beams; and a plurality of waveguides for receiving the plurality of output light beams.

3. The device according to claim 2, wherein the diffraction grating means is adapted to reflect the first and second plurality of sub-beams back parallel to the input sub-beams whereby the light collimating means is also the light focussing means, the first polarization means is also the second polarization means, and the polarization beams splitting means is also the polarization beam combining means.

4. The device according to claim 1, wherein the light-blocking means is an iris.

5. The device according to claim 1, wherein the diffraction grating means is arranged whereby the two sub-beams are image superimposed thereon.

6. The device according to claim 5, wherein portions of both of the sub-beams are not properly polarized, and wherein the light blocking means is annular for eliminating at least some of the portions of the sub-beams that are not properly polarized.

7. The device according to claim 1, wherein the polarization beam splitting means is half-wave plate.

8. The device according to claim 1, wherein the first polarization rotating means is a half-wave plate.

9. The device according to claim 1, wherein the light collimating means is a grin lens.

10. The device according to claim 1, wherein the light blocking means is adapted to ensure that a zero in a deffraction pattern thereof falls on a neighboring output channel.

\* \* \* \* \*